United States Patent [19]

Gilmore

[11] 4,339,213

[45] Jul. 13, 1982

[54] TERMINATION ANCHORAGE

[75] Inventor: William J. Gilmore, Manitou Beach, Mich.

[73] Assignee: Acco Industries Inc., Trumbull, Conn.

[21] Appl. No.: 156,468

[22] Filed: Jun. 4, 1980

[51] Int. Cl.³ .............................................. F16G 11/10
[52] U.S. Cl. .................... 403/316; 24/131 C; 74/501 R; 248/74 R; 248/225.3 R
[58] Field of Search ............... 24/27, 257 R, 131 C; 248/74, 74 R, 225.3; 403/74, 316, 229; 74/501 R, 501 P

[56] References Cited

U.S. PATENT DOCUMENTS

| | | | |
|---|---|---|---|
| 2,244,714 | 6/1941 | Livergood | 403/316 |
| 2,267,802 | 12/1941 | Purdy | 403/316 |
| 2,399,133 | 4/1946 | Midling | 403/316 |
| 3,032,375 | 5/1962 | Lalandre | 297/440 |
| 3,230,595 | 1/1966 | Kedem | 24/257 R |
| 3,907,447 | 9/1975 | Arkharov et al. | 403/316 |
| 3,955,441 | 5/1976 | Johnson | 403/316 X |
| 4,099,298 | 7/1978 | Gimenez | 24/27 |
| 4,131,167 | 12/1978 | Richey | 403/229 X |

FOREIGN PATENT DOCUMENTS 874574  4/1953  Fed. Rep. of Germany ...... 403/229

Primary Examiner—Ramon S. Britts
Attorney, Agent, or Firm—Pennie & Edmonds

[57] ABSTRACT

A termination anchorage for anchoring a circular termination member having an annular groove into a U-shaped slot contained in a bracket. A coil spring lock surrounds and engages the tubular member and has a tip which engages a hole in the bracket to lock the termination member into the slot.

3 Claims, 4 Drawing Figures

U.S. Patent   Jul. 13, 1982   4,339,213
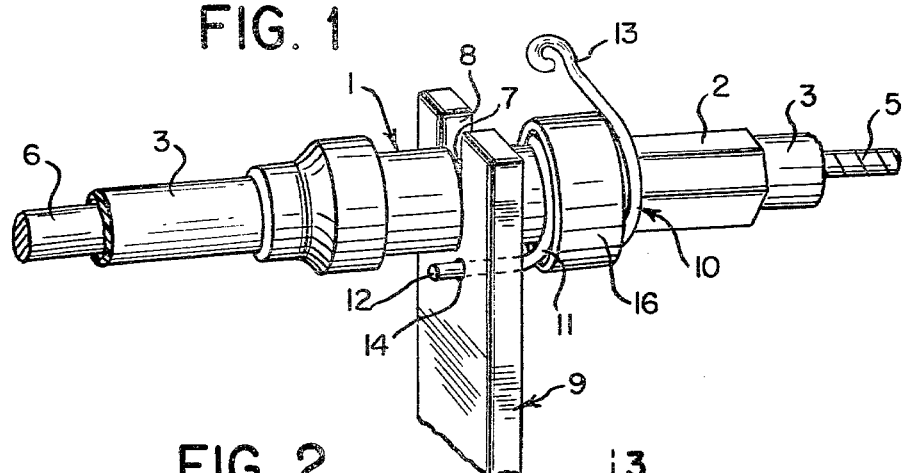
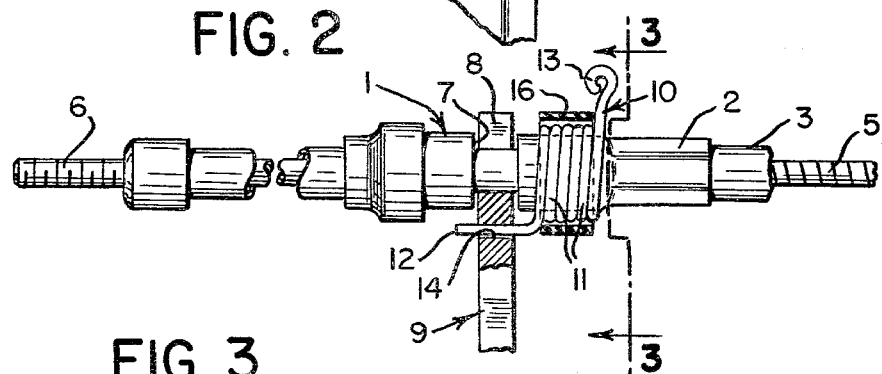
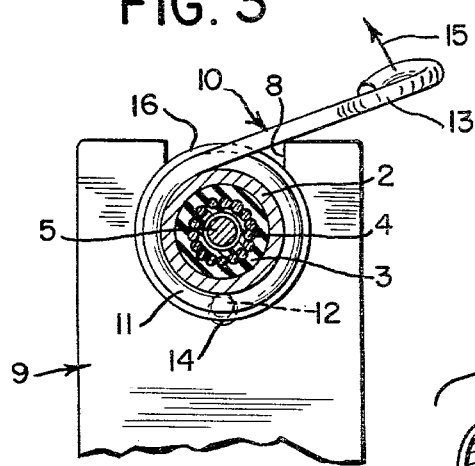
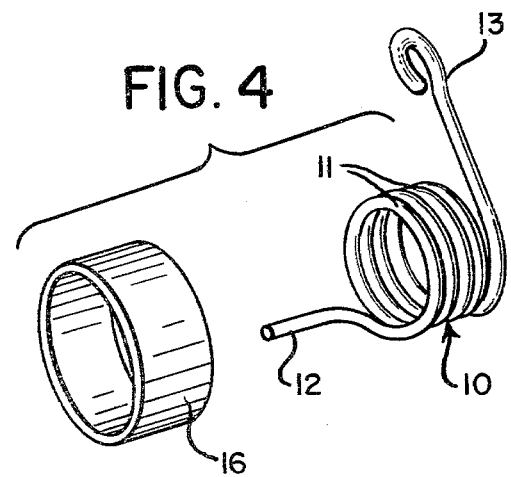

TERMINATION ANCHORAGE

TECHNICAL FIELD

The invention relates to a termination anchorage for anchoring a termination member into a U-shaped slot contained in a bracket and more particularly to a means for preventing the termination member from inadvertently becoming disengaged from the slot.

BACKGROUND OF THE INVENTION

Termination anchorages are utilized to anchor the ends on such items as cable conduits to bulkheads or brackets and where the cable conduits may serve to guide push-pull type control cables. Some termination anchorages have included such components as U-bolts, nuts, washers and spacers to anchor push-pull conduit fittings to brackets. The components making up such anchorages are relatively expensive, and because of the various parts, require considerable time to assemble.

Termination anchors have been provided utilizing a bracket and a U-shaped slot therein which is adapted to engage with an annular groove in a termination member which in turn is connected to a push-pull cable conduit. Such anchorages have not been entirely satisfactory in practice as the termination member may inadvertently slip out of the slot due to vibration or due to gravity forces in the event that the bracket containing the slot is turned.

It is therefore an object of my invention to provide for a termination anchorage which is inexpensive to make, easy to assemble, and which will insure effective anchorage under vibratory conditions and notwithstanding the position of any bracket forming a part of the anchorage device.

GENERAL DESCRIPTION OF THE INVENTION

Broadly a termination anchorage according to my invention comprises a bracket having a U-shaped slot which is adapted to engage with an annular groove in a circular termination member where the member may be attached to an item to be anchored, for example a push-pull cable conduit. A coil spring lock is provided where the inner diameters of the coils making up the coil spring lock are less than the outer diameter of the termination member. The coil spring lock is adapted to slide over the termination member when a force is applied to uncoil the coils and to effectively increase the inner diameter of the coils.

A tip of the coil spring lock is adapted to engage into a hole in the bracket such that the spring and termination member are locked into the U-shaped slot in the bracket preventing any inadvertent movement of the termination member out of the slot. The coil spring lock has a handle at its end opposite to the spring tip so that a turning or uncoiling force may be imparted onto the coils to effectively increase their inner diameters. When it is desired to move the tip into and out of engagement with the hole in the bracket, the handle is moved to uncoil the coils thus effectively increasing the inner diameter of the coils allowing the coil spring to be moved linearly with respect to the termination member and so allow the spring tip to be moved into and out of engagement with the hole in the bracket.

A resilient collar is further preferably provided which fits over the coils of the coil spring lock to prevent binding of adjacent coils when the coil spring lock is subjected to an uncoiling force.

DESCRIPTION OF THE DRAWINGS

FIG. 1 is a perspective view of a termination anchorage constructed according to the invention;

FIG. 2 is a partial sectional view of the termination anchorage of FIG. 1;

FIG. 3 is an enlarged sectional view of FIG. 2 taken along line 3—3; and

FIG. 4 is an enlarged perspective view of the coil spring lock and resilient collar of the termination anchorage of FIG. 1.

BEST MODE FOR CARRYING OUT THE INVENTION

Referring to FIG. 1, there is illustrated a circular termination member 1 having a skirt portion 2 which is fixedly connected to a flexible cable conduit 3 by swaging or by other means. The conduit 3 may comprise an elastomeric or plastic material in which a plurality of twisted wires 4 are embedded as shown in FIG. 3. Conduit 3 may serve as a guide for a push-pull control cable 5. Cable 5 in turn may have a threaded stud 6 connected thereto to which a control knob, not shown, may be mounted. The termination member 1 has an annular groove 7 therein which is adapted to be placed into a U-shaped slot in a bracket 9.

A coil spring lock member 10 surrounds the termination member 1 and comprises a plurality of coils 11, a spring tip 12 which extends parallel to the longitudinal axis of the coils 11 and a handle 13 which is on the end of the spring coil lock opposite the spring tip 12. The inner diameters of coils 11 are less than the diameter of the circular termination member 1 when the spring coil lock is in the unstressed condition such as is shown in FIG. 4. The result is that when the spring coil lock 10 is placed on the termination member 1, it will be securely affixed to the member.

As shown in FIGS. 1 and 2, the spring tip 12 fits into a hole 14 contained in the bracket 9 and when so placed, will prevent the termination member from moving out of the open end of the U-shaped slot.

If a force is exerted on the handle 13 in a counterclockwise direction as shown by arrow 15 in FIG. 3, the coils 11 will tend to uncoil and expand whereby their inner diameters will increase allowing the spring coil lock 10 to be moved linearly with respect to the member 1.

A resilient collar 16 fits over the coils of the coil spring lock as shown in FIG. 2 and prevents bending or misalignment of the spring and subsequent binding of adjacent coils against each other when an uncoiling force is exerted on handle 13.

The termination anchor is assembled by moving the coil spring back over the termination member while an uncoiling force is exerted on handle 13. The termination member is placed into the bracket 9 so that its annular groove 7 is engaged by the side walls of the slot 8. The spring lock 10 is then moved to the left as shown in FIG. 2 while an uncoiling force is exerted on handle 13 until the spring tip 12 engages into the hole 14. The uncoiling force is thus removed from handle 13. The termination anchorage is then complete and the termination member is fully locked into place in the bracket 9 by the spring termination tip 12.

In order to unlock the device, uncoiling pressure is exerted on handle 13 to increase the inner diameter of the coils 11 after which the coil lock spring is moved to the right as shown in FIG. 2 to withdraw the spaced termination tip from the hole in the bracket. The termination member may then be lifted out the open end of the slot in the bracket.

It is seen that a termination anchorage constructed according to the invention requires a minimum of easily machined parts thus reducing the expense of manufacture and that assembly of the termination member with a holding bracket requires movement of a minimum number of parts.

I claim:

1. A termination anchorage for a circular termination member where said anchorage includes a bracket having a U-shaped slot contained therein adapted to engage with an annular groove in said termination member; the improvement comprising in having a coil spring lock adapted to surround a termination member where the inner diameters of the coils of the coil spring lock are less than the outer diameter of the termination member when the coil spring lock is in an unstressed state, in having a spring tip on said coil spring lock extending parallel to the longitudinal axis of the coils, and in having a hole in said bracket adapted to be engaged by said spring tip whereby when the annular groove of a termination member is engaged by said slot, said coil spring lock will lock and engage with said termination member and said tip will engage with said hole to prevent movement of the annular groove out of said U-shaped slot.

2. A termination anchorage according to claim 1, the improvement further comprising in that said coil spring lock has a radially extending handle on the end of said coil spring opposite said spring tip whereby an uncoiling force may be applied to said coil spring lock to increase the inner diameters of the coils to allow the coil spring lock to be moved longitudinally with respect to the termination member in order to move the spring tip with respect to the hole in the bracket.

3. A termination anchorage according to claim 2, the improvement further comprising in having a resilient collar surrounding the coils of said coil spring lock whereby binding of adjacent coils of the spring lock is prevented when an uncoiling force is applied to the handle to increase the inner diameters of the coils.

* * * * *